July 15, 1947.                C. J. BISHOP                2,423,868
                      METHOD OF FORMING BEARING LINERS
                              Filed June 7, 1943

INVENTOR.
CHARLES J. BISHOP
BY
Whittemore Hulbert & Belknap
ATTORNEYS

Patented July 15, 1947

2,423,868

UNITED STATES PATENT OFFICE 2,423,868

METHOD OF FORMING BEARING LINERS

Charles J. Bishop, Detroit, Mich., assignor to Bohn Aluminum & Brass Corporation, Detroit, Mich., a corporation of Michigan Application June 7, 1943, Serial No. 489,949

4 Claims. (Cl. 29—149.5)

The invention relates to method of forming bearing liners and has for its primary object the obtaining of a construction which facilitates the rapid dissipation of heat therefrom when the bearing is in use. The invention has more particular application to method of forming segmental liners in which the outer or supporting shell is of extra thickness and corresponding rigidity.

Segmental bearing liners are usually formed with an outer supporting shell and a lining of bearing metal. As originally formed, the shell is of an external diameter somewhat greater than that of the seat in which the liner is to be placed. It is then pressed into a segmental die of a radius corresponding to that of the seat and the projecting longitudinally extending edges are trimmed to obtain the proper circumferential length. However, it has been found that bearings so formed do not perfectly contact with the seats in which they are placed, but leave certain areas that are out of contact. Consequently, when the bearing is in use and heat is frictionally generated its dissipation will be retarded by the limited area in conductive contact.

One reason for the result just described is that the external surface of the shell is not originally of true cylindrical form, but may be of a more or less wavy character. The pressing of the segment in the die is intended to take out these imperfections, but actually does not accomplish the result, first, because the pressure is not uniform in all radial directions and, second, the inherent resiliency in the metal of the shell will cause it to return more or less to its original shape after removal from the die.

To overcome the defects just described, I have devised a method of manufacture in which the segmental bearings are formed from a complete tube, the outer surface of which is of true cylindrical form and of an exactly predetermined radius. This radius is greater than that of the seat in which the segmental bearings are to be placed so as to allow for the amount of metal removed in the severing operation. The severing is preferably effected in two steps, first, the longitudinal slotting of one side of the tube, after which it is compressed in dies to bring the opposite edges of the slot together and to form a true cylinder of smaller diameter. The second step is the slotting of the diametrically opposite side of the tube to sever the same into segments. These segments are then pressed into a semi-cylindrical die and the longitudinal edges are trimmed to obtain the proper circumferential length. This completes the operation and a liner segment thus formed when engaged in its seat will have all portions of its external surface in heat conducting contact with the seat so as to greatly expedite heat dissipation.

The several steps as above given are illustrated in the accompanying drawings, in which Figure 1 is the original tubular blank from which the liners are formed;

Figure 1:
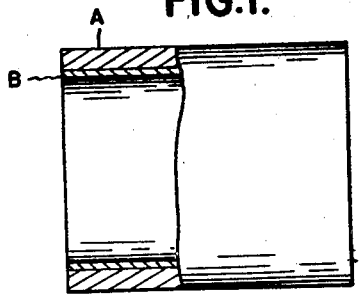
Figure 2:
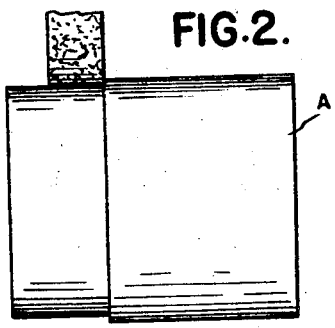
Figure 2 is a similar view showing the manner of fashioning the blank to a true cylindrical external form.
Figure 3:
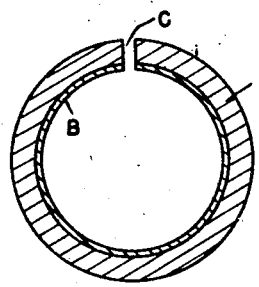
Figure 3 is a cross section of the blank illustrating the slotting of the same longitudinally on one side.
Figure 4:
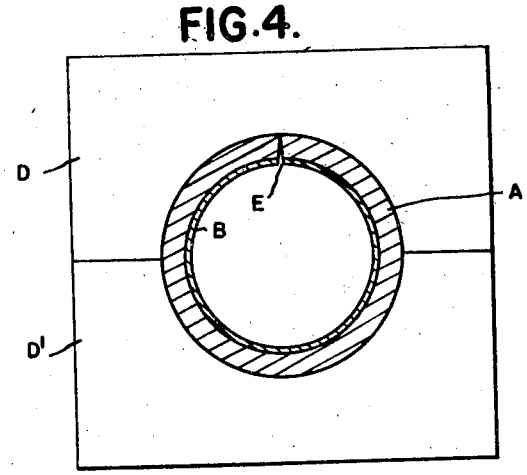
Figure 4 is a similar view showing the means for reducing the diameter of the blank bringing the opposite edges of the slot together.
Figure 5:
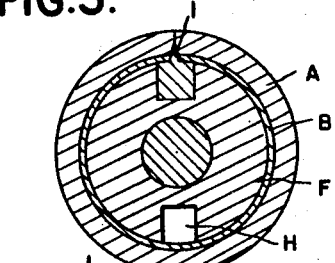
Figure 5 illustrates the blank, as in Figure 4, positioned on a mandrel preparatory to the second slotting operation.
Figure 7:
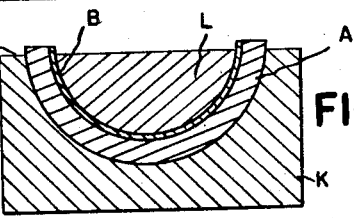
Figure 7 illustrates the operation of trimming the longitudinal edges of the segments.
Figure 6:
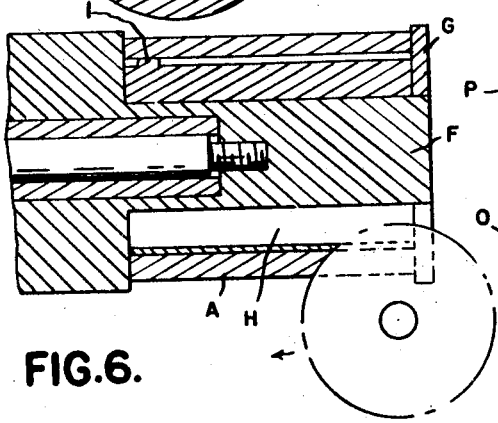
Figure 6 shows the second slotting operation.
Figure 8:
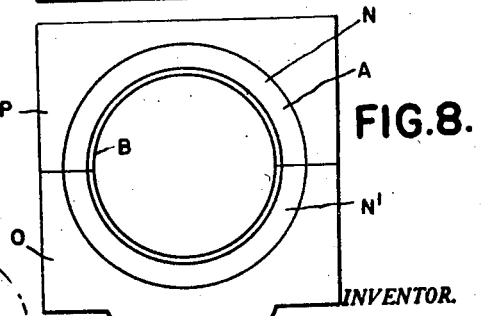
Figure 8 shows the complementary segments in engagement with the seats therefor as, for instance, in a connecting rod.

Tubing, as commercially manufactured, is not of uniform diameter, but has a considerable range of variation. Therefore the bearing blank, including the outer shell A and the lining B of bearing metal, is first externally fashioned to a true cylindrical form of predetermined diameter. This is preferably accomplished by a grinding operation, as illustrated in Figure 2. The cylindrical blank thus formed is next slotted longitudinally on one side thereof, as indicated at C, Figure 3. It is next placed between a pair of semi-cylindrical female dies D and D' and compressed therein to bring together the edges which are on opposite sides of the slot. These edges are first parallel, but due to a contraction in diameter of the cylinder are changed in angularity so as to leave a narrow crevice E between their inner edges. The blank is then placed on a mandrel F and secured thereto by clamps G. This mandrel has a longitudinally extending groove or recess H and diametrically opposite this recess a locating projection I for engaging the crevice E. The tube is then severed by a cutting tool J which extends through the wall and into the longitudinal groove H. The severed segments are then removed from the mandrel and are clamped in a semi-cylindrical die K by a core member L, after which the longitudinal edges are trimmed, as indicated by the line M. The internal diameter of the die K is the same as that of the seat in which the liner is placed and the trimming reduces the circumferential length to be but slightly more than one-half of the full circle. Thus the segments N, N' so formed when clamped in their seats, such as a connecting rod O and cap P, will form a substantially perfect contact with the full area of the seat for rapid dissipation of the heat frictionally produced when the bearing is in operation.

What I claim as my invention is:

1. In a method of forming bearing liners, the steps of fashioning from commercial tubing a tubular blank with a true cylindrical outer surface of an exactly predetermined radius, slotting said blank longitudinally on one side thereof, die-pressing the slotted blank to bring the opposite edges of the slot together and to form a true cylindrical outer surface of smaller radius, slotting the blank diametrically opposite the abutting edges to form separate equal segments, contracting said segments by forcing the same into a segmental die of smaller radius, and trimming the edges to obtain a predetermined circumferential length such as to form of the complementary segments a full circle of said smaller radius.

2. In the method of forming bearing liners, the steps of fashioning from commercial tubing a tubular blank with a true cylindrical outer surface of an exactly predetermined radius, successively longitudinally slotting the blank on diametrically opposite sides thereof to form separate segments, in die-pressing the blank after each slotting operation to successively obtain true cylindrical segments of progressively smaller radii and trimming the edges of said segments after the last die-pressing operation to obtain an exact circumferential length such as to form of the complementary segments a full circle of said smaller radius.

3. In a method of forming bearing liners, the steps of fashioning from commercial tubing a tubular blank with a true cylindrical outer surface of exactly predetermined radius, longitudinally slotting said blank on one side thereof, die-pressing the slotted blank to contract the same into a true cylinder of smaller radius with the edges on opposite sides of the slot brought into contact but leaving a crevice adjacent to the inner face due to change in angularity, placing the contracted blank on a mandrel and locating the same thereon by said crevice, slotting the blank diametrically opposite said crevice, in contracting the severed segments by forcing the same into a segmental die of smaller radius and in trimming the edges of said segments to obtain an exact circumferential length such as to form of the complementary segments a full circle of said smaller radius.

4. In a method of forming bearing liners, the steps of grinding a tubular blank of commercial tubing to form a true cylindrical outer surface of exactly predetermined radius, longitudinally slotting said blank on one side thereof, die-pressing the slotted blank to contract the same into a true cylinder of smaller radius with the edges on opposite sides of the slot brought into contact but leaving a crevice adjacent to the inner face due to change in angularity, placing the contracted blank on a mandrel and positioning the same thereon by a locator engaging said crevice, slotting the blank diametrically opposite said crevice, contracting the severed segments by forcing the same into a segmental die of smaller radius and in trimming the edges of said segments to obtain an exact circumferential length such as to form of the complementary segments a full circle of said smaller radius.

CHARLES J. BISHOP.

REFERENCES CITED

The following references are of record in the file of this patent:

UNITED STATES PATENTS

| Number | Name | Date |
|---|---|---|
| 1,922,304 | Klocke | Aug. 15, 1933 |
| 2,333,227 | Bagley, Jr. | Nov. 2, 1943 |
| 2,177,584 | Salansky | Oct. 24, 1939 |
| 2,230,637 | Biedermann | Feb. 4, 1941 |
| 1,359,331 | Chadwick | Nov. 16, 1920 |
| 1,441,325 | Berthet | Jan. 9, 1923 |
| 1,554,493 | Eggenweiler | Sept. 22, 1925 |